United States Patent
Lu et al.

(10) Patent No.: US 11,288,105 B2
(45) Date of Patent: Mar. 29, 2022

(54) PREVENTING DEADLOCKS IN RUNTIME

(71) Applicant: International Business Machines Corporation, Armonk, NY (US)

(72) Inventors: Jing Lu, Beijing (CN); Bao Zhang, Beijing (CN); Ming Ran Liu, Beijing (CN); Tie Liu, Beijing (CN); Xiao Yan Tang, Beijing (CN); Xiang Zu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 16/939,289

(22) Filed: Jul. 27, 2020

(65) Prior Publication Data
US 2022/0027213 A1    Jan. 27, 2022

(51) Int. Cl.
*G06F 9/46*    (2006.01)
*G06F 9/52*    (2006.01)

(52) U.S. Cl.
CPC .................... *G06F 9/524* (2013.01)

(58) Field of Classification Search
CPC ....................................................... G06F 9/524
See application file for complete search history.

(56) References Cited

U.S. PATENT DOCUMENTS

| | | |
|---|---|---|
| 8,117,616 B2 | 2/2012 | Lewis |
| 9,052,967 B2 | 6/2015 | Gao et al. |
| 2013/0283086 A1 | 10/2013 | Bradley et al. |
| 2013/0332910 A1 | 12/2013 | Ganai |
| 2014/0250441 A1 | 9/2014 | Tonouchi |
| 2019/0114248 A1 | 4/2019 | Liu et al. |

FOREIGN PATENT DOCUMENTS

| | | |
|---|---|---|
| CN | 1297198 A | 11/2000 |
| CN | 102073588 B | 11/2013 |
| CN | 107479980 A | 12/2017 |

OTHER PUBLICATIONS

Wang et al., "Gadara: Dynamic Deadlock Avoidance for Multithreaded Programs," 8th USENIX Symposium on Operating Systems Design and Implementation, USENIX Association, pp. 281-294, 2008.

*Primary Examiner* — Gregory A Kessler
(74) *Attorney, Agent, or Firm* — Kelli D. Morin

(57) ABSTRACT

Provided is a method for preventing deadlocks between competing threads. The method includes receiving a lock request from a first thread and, in response, identifying a potential deadlock with a second thread. In response, the method includes determining whether to deny the lock request, which includes: determining whether a first duration for which the first thread will hold the lock to complete its job is longer than a second duration for which the second thread will hold the lock to complete its job; determining whether the second thread will start to use the lock soon relative to the first duration; and determining whether both the first and second threads will complete their respective jobs within a time limit if the lock is denied to the first thread while the second thread completes its job. The method further includes denying the request for the requested lock from the first thread.

20 Claims, 10 Drawing Sheets

| Time Line | Thread T1 | Thread T2 |
|---|---|---|
| 1 | Request Lock L1 (granted) | |
| 2 | Perform some action | Request Lock L2 (granted) |
| 3 | Request Lock L2 (denied) | Request Lock L1 (denied) |
| 4 | (Wait while L2 is held by T2) | (Wait while L1 is held by T1) |

FIG. 1

PREVENTING DEADLOCKS IN RUNTIME

BACKGROUND

The present disclosure relates generally to the field of managing thread access to locks while running a program, and more particularly to managing thread access so as to prevent deadlocks between competitive threads.

A lock ensures that only one thread can access a particular resource at a time. More specifically, a lock provides exclusive access to a resource, and a lock is only granted to one thread at a time. In order to complete their respective jobs, different threads may need access to the same resource at overlapping times. These threads are referred to as competitive threads because they compete for the same lock to gain access to the same resource, but only one of them can have access to the lock at a time. In some instances, competitive threads seek access to the multiple of the same resources, which can create a deadlock if neither thread can proceed without the lock that the other thread has.

SUMMARY

Embodiments of the present disclosure include a method, computer program product, and system for preventing deadlocks while running a program. The method comprises receiving a request for a lock from a first thread. The method further comprises, in response to receiving the request, identifying a potential deadlock between the first thread and a second thread, the potential deadlock associated with access to the requested lock. The method further comprises, in response to identifying the potential deadlock, determining whether to deny the request for the lock. Determining whether to deny the request comprises determining whether a first duration for which the first thread will hold the requested lock to complete its respective job is longer than a second duration for which the second thread will hold the requested lock to complete its respective job. Determining whether to deny the request further comprises determining whether the second thread will start to use the requested lock soon relative to the first duration. Determining whether to deny the request further comprises determining whether both the first and second threads will complete their respective jobs within a time limit if the requested lock is denied to the first thread while the second thread completes its job. The method further comprises denying the request for the requested lock from the first thread.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 1 depicts an example of a deadlock between two competitive threads of a program, in accordance with embodiments of the present disclosure.

Figure 2:
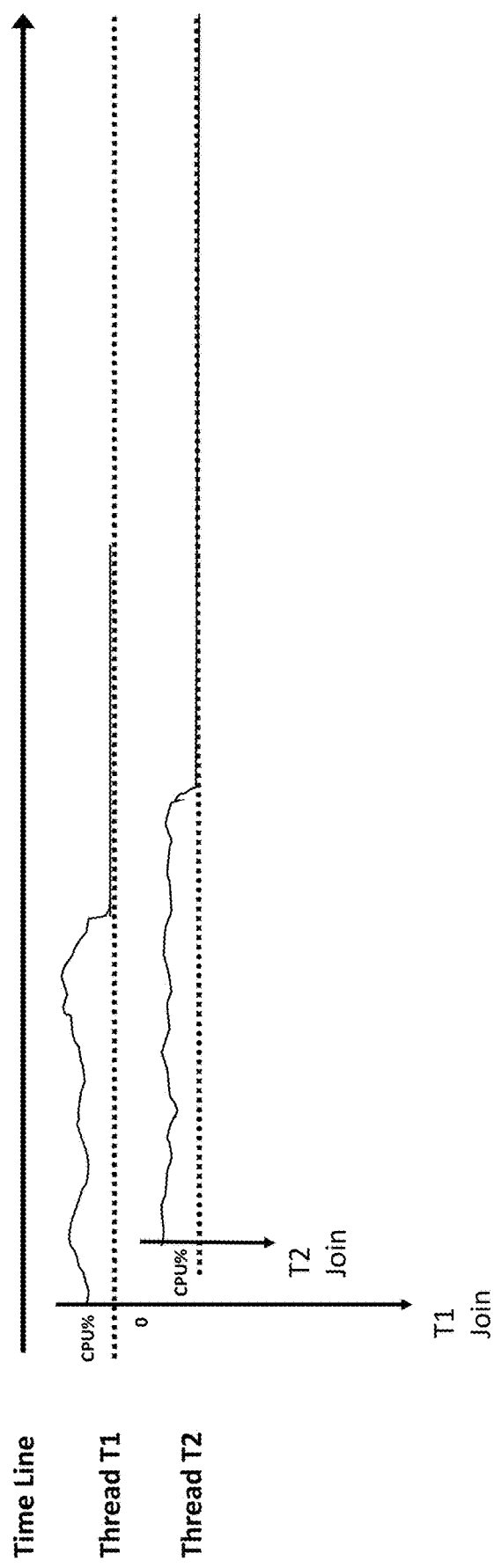
FIG. 2 depicts a schematic view of CPU usage data collected while two competitive threads of a program are running competitively, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of multithreaded processing, and more particularly to managing thread access so as to prevent deadlocks between competitive threads. While the present disclosure is not necessarily limited to such applications, various aspects of the disclosure may be appreciated through a discussion of various examples using this context.

As mentioned above, in some instances, competitive threads seek access to multiple of the same resources, which can create a deadlock if neither thread can proceed without the lock that the other thread is currently utilizing. For example, FIG. 1 illustrates a table depicting an example of a deadlock between two competitive threads of a program, in accordance with embodiments of the present disclosure. As depicted in the table, at time 1, a first thread T1 needs access to a first resource (associated with lock L1) and, at time 3, also needs access to a second resource (associated with lock L2) while it has access to the first resource. A competing second thread T2, needs access to the second resource (associated with lock L2) at time 2 and also needs access to the first resource (associated with lock L1) at time 3 while it has access to the second resource. Once thread T1 has acquired the lock L1 for the first resource at time 1, thread T2 is prevented from accessing the first resource until thread T1 has finished using the first resource and released the lock L1, as shown at time 4. However, in the meantime, at time 2, thread T2 has acquired the lock L2 for the second resource. Accordingly, thread T1 is prevented from accessing the second resource until the thread T2 has finished using the second resource and released the lock L2 at time 4.

As illustrated, both of the threads T1 and T2 are simultaneously waiting for a lock that is held by the other thread. Neither thread can proceed without the lock that the other thread has, so both threads are stuck in a deadlock indefinitely. Because neither thread can complete its job, both threads fail, which can lead to a variety of problems for the program utilizing the threads.

There are some current methods and tools used to detect deadlocks, but these detection methods and tools are not always reliable. For example, they may generate false positives. In some current detection methods, information pertaining to the locks is not recorded in profiling data. Accordingly, some tools rely on analysis of CPU utilization (e.g., CPU %) to detect problems. If the CPU % for a thread drops to zero, as shown in FIG. 2, this may indicate that there is a deadlock, but alternatively it may indicate some other problem with a program or with an input or output of a program. Accordingly, it may be difficult even to determine if a deadlock is the root cause of a detected problem. Furthermore, once a deadlock has been detected, a tremendous amount of effort and resources may be required to confirm and correct the programming that has led to the deadlock.

It is desirable to be able to reliably detect deadlocks and to address them without having to change source code or recompile a program. Accordingly, the present disclosure provides a method that includes recording acquisition and release timestamps for each lock. This data is used to improve the reliability and accuracy of deadlock detection. Additionally, this data is also used to prevent the detected deadlocks by dynamically managing access to the locks among competitive threads without the need to change source code or recompile the existing program.

It is generally assumed for the purposes of this disclosure that the time that a thread requests a lock and the time that the lock is granted or denied are nearly simultaneous. Accordingly, the time that a thread requests a lock may be referred to as the request time, but may also be referred to as the acquisition time or the denial time.

A runtime library (also referred to herein as the "runtime") manages access to locks based on a variety of data. More specifically, in at least one embodiment of the present disclosure, the runtime manages access to locks based on enhanced program profiling data. As discussed in further detail below, the runtime generates enhanced program profiling data based on preliminary data and additional data. Preliminary data may include, but is not limited to, competitive scenario data and competitive CPU % data. Competitive scenario data may include initial start times for competitive threads and initial times that competitive threads request locks. Additional data may include, but is not limited to, non-competitive lock usage data and threshold values. Non-competitive lock usage data may include timestamps, adjusted timestamps, and non-competitive CPU % data.

In some embodiments of the present disclosure, the runtime can gather preliminary data by allowing threads to run competitively without intervening and recording the resulting deadlock information. In an alternative embodiment of the present disclosure, the runtime can gather preliminary data based on logged information relating to the occurrence of deadlock conditions among threads that was collected by a deadlock detection tool during previous executions of the software code.

Regardless of how the runtime gathers the preliminary data, the preliminary data is gathered from execution of the software code in a competitive scenario. In other words, preliminary data is gathered from a scenario in which competitive threads are run competitively. Therefore, as mentioned above, the preliminary data may include competitive scenario data such as an initial start time for each competitive thread and an initial time that each thread requests each lock. Additionally, in some embodiments of the present disclosure, preliminary data may also include CPU %. As discussed in further detail below, the preliminary data is used by the runtime to determine lock access management.

To gather additional data, the runtime manages competitive threads to run in a non-competitive scenario. The runtime knows which threads and locks are competitive based on potential deadlock data and/or preliminary data that was previously gathered. In the non-competitive scenario, the first thread that requests any lock that is a competitive lock with any other thread will be run in its entirety while the runtime denies any requests for competitive locks until that first thread has completed its entire job. An example of this non-competitive scenario is shown in FIG. 3.

Figure 3:
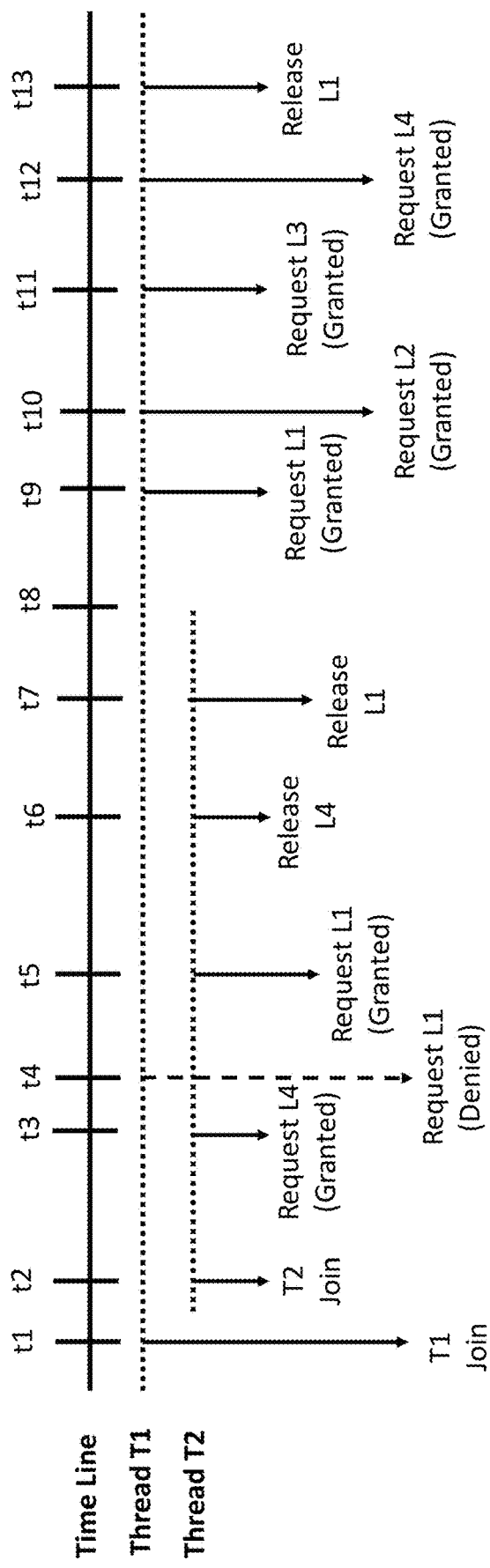
FIG. 3 depicts a schematic view of a timeline showing lock request handling while the two competitive threads of FIG. 2 are run non-competitively, in accordance with embodiments of the present disclosure.

As shown in FIG. 3, thread T1 and thread T2 both need lock L1 and both need lock L4 in order to complete their respective jobs. Thread T2 is the first thread to request either of lock L1 or lock L4, as shown at times t5 and t3, respectively. Accordingly, the runtime manages the threads such that the request from thread T2 for the lock L4 is granted, and thread T2 is run in its entirety before thread T1 is allowed to begin running. In other words, the runtime denies the request from thread T1 for the lock L1 until thread T2 has completed its job, even if thread T1 requests lock L1 before thread T2 requests lock L1, because thread T2 requested another competitive lock (lock L4) before thread T1 requested any competitive lock. Once thread T2 has completed its job, the runtime allows thread T1 to run in its entirety.

Accordingly, to gather additional data, the runtime runs both threads T2 and T1 as though there was no competition with any other thread. While each of threads T2 and T1 is being run in this non-competitive scenario, non-competitive lock usage data is being generated and recorded. As discussed in further detail below, the runtime uses this non-competitive lock usage data to enhance the overall program profiling data, and the runtime uses the enhanced program profiling data for subsequent management of the threads.

As shown in FIG. 3, the non-competitive lock usage data includes timestamps for each event that occurred while the threads T2 and T1 were run in the non-competitive scenario. For example, time t1 represents the time at which thread T1 joined, time t2 represents the time at which thread T2 joined, time t3 represents the time at which thread T2 requested and/or acquired lock L4, time t4 represents the time at which thread T1 requested and/or was denied lock L1, time t5 represents the time at which thread T2 requested and/or acquired lock L1, time t6 represents the time at which thread T2 released lock L4, time t7 represents the time at which thread T2 released lock L1, time t8 represents the time at which thread T2 completed its job, time t9 represents the time at which thread T1 acquired lock L1, time t10 represents the time at which thread T1 requested and/or acquired lock L2, time t11 represents the time at which thread T1 requested and/or acquired lock L3, time t12 represents the time at which thread T1 requested and/or acquired lock L4, and time t13 represents the time at which thread T1 released lock L1. In some embodiments of the present disclosure, the non-competitive lock usage data may include more information than is discussed here for the purposes of this example illustration.

Figure 4:
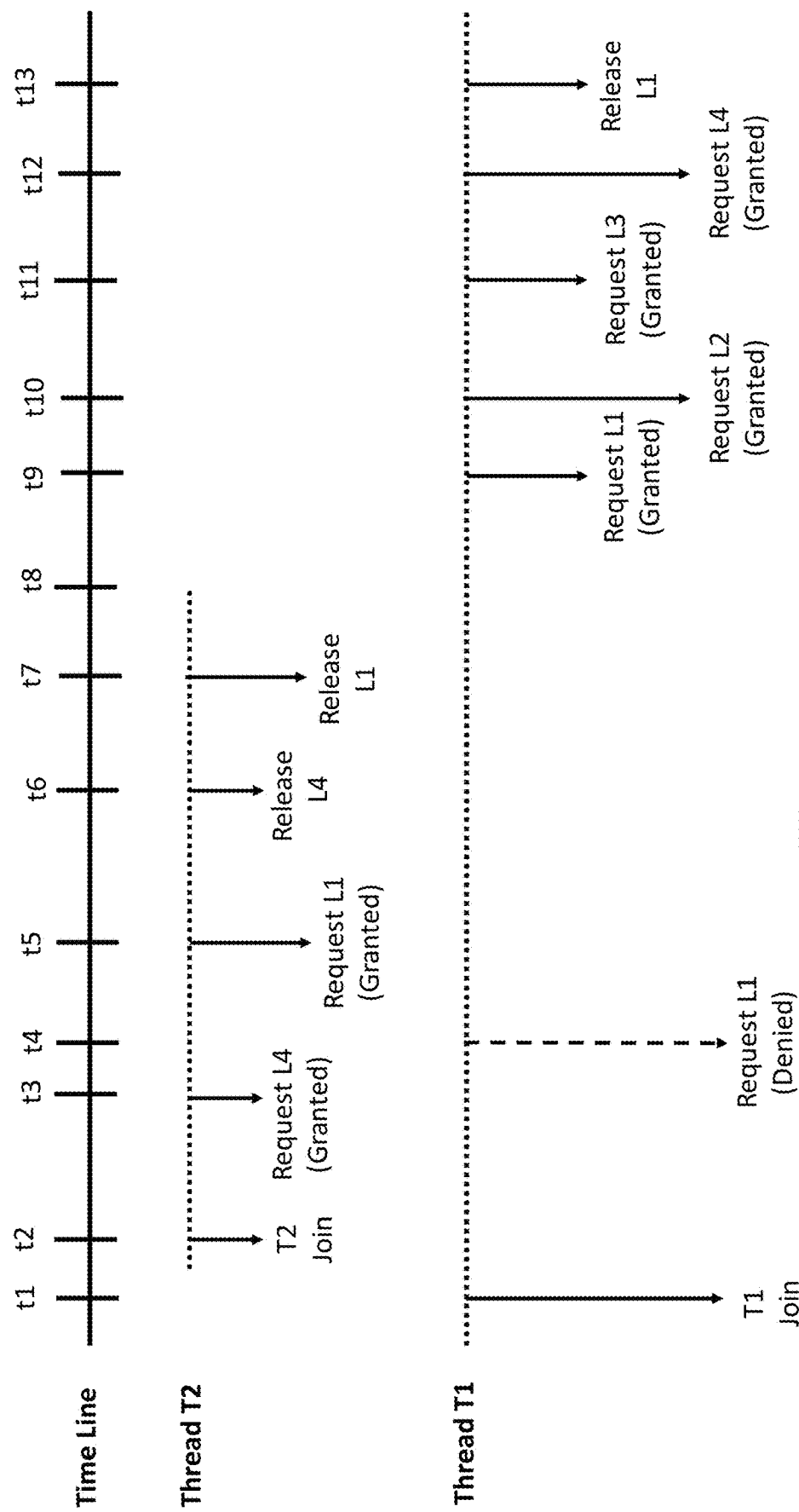
FIG. 4 depicts a schematic view of the data of FIG. 3 separated by each of the two competitive threads, in accordance with embodiments of the present disclosure.

Once the runtime has gathered these timestamps t1-t13 from the non-competitive lock usage data, the runtime separates the non-competitive lock usage data for each thread, as shown in FIG. 4. The runtime then treats the non-competitive lock usage data as though it were truly non-competitive by ignoring, or "removing," any time that a thread was waiting for a competitive thread to run its entire job.

Figure 5:
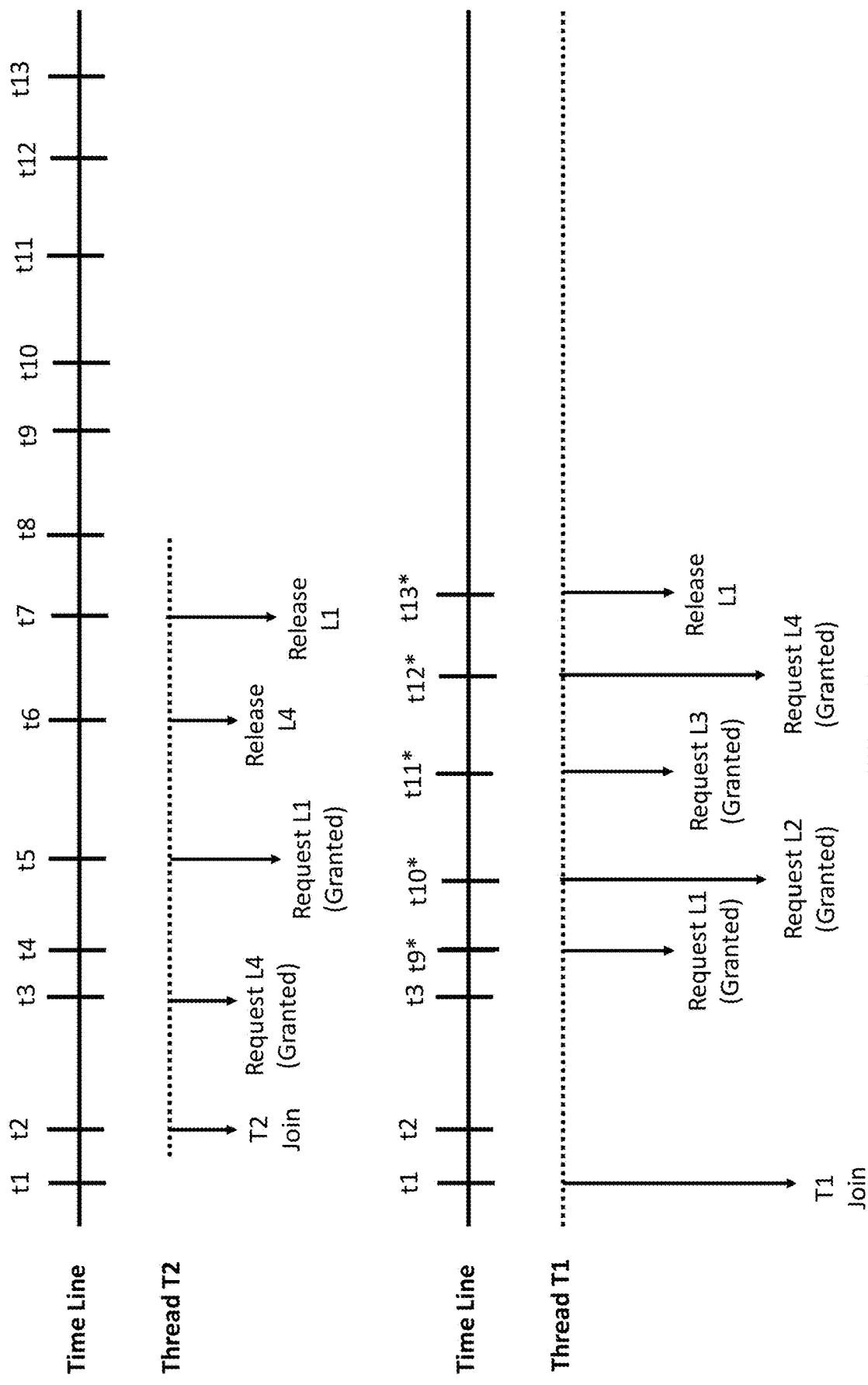
FIG. 5 depicts a schematic view of the data of FIG. 4 with an adjusted timeline, in accordance with embodiments of the present disclosure.

For example, as shown in FIG. 5, in the gathered non-competitive lock usage data pertaining to thread T1, the runtime ignores the duration of time between time t4, when thread T1 requested and was denied access to lock L1 (because thread T2 was being run in its entirety), and time t9, when thread T1 was granted access to lock L1 (because thread T2 had completed its entire job), because in a truly non-competitive usage, the total time for thread T1 to complete its job would not include that duration of time. Accordingly, as shown in FIG. 5, in the gathered non-competitive lock usage data pertaining to thread T1, when the wait time has been removed, time t9 becomes adjusted time t9* (which is considered to be coincident with time t4), time t10 becomes adjusted time t10*, etc. The asterisk indicates that the time of the respective event has been adjusted in accordance with the assumption that the wait time would not occur if thread T1 was run completely independently of thread T2. Accordingly, the additional data used by the runtime also includes these adjusted timestamps t9*-t13*.

Figure 6:
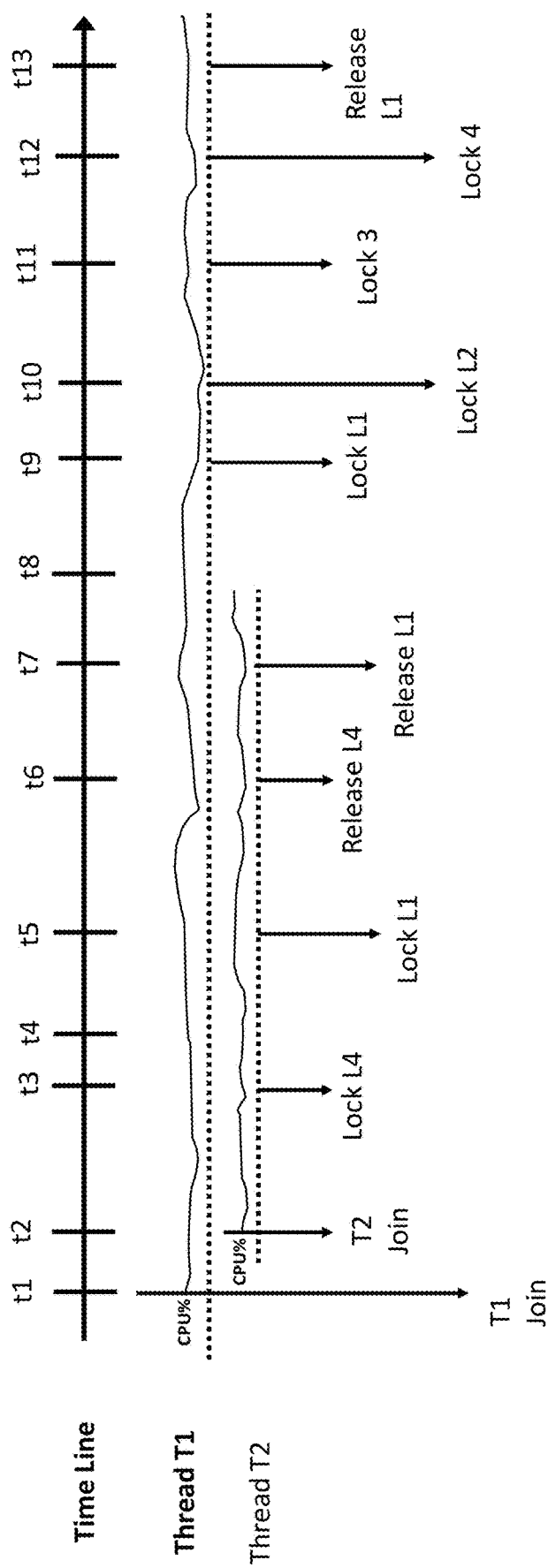
FIG. 6 depicts CPU usage data collected for the two competitive threads while the two competitive threads are running non-competitively, in accordance with embodiments of the present disclosure.

As shown in FIG. 6, while threads T2 and T1 are run in the non-competitive scenario (as shown in FIG. 3), non-competitive CPU % data for each thread is also collected. Accordingly, the additional data used by the runtime also includes non-competitive CPU % data. As illustrated by the CPU % data shown in FIG. 6, running the threads T2 and T1 in the non-competitive scenario prevents the CPU % from dropping to zero for either thread, as it does in FIG. 2. The timestamps t1-t13 can be considered together with the non-competitive CPU % data to generate a "real usage time" that each lock is used by each thread. More specifically, for each lock, multiplying the difference between the acquisition time and release time for the lock (from the timestamps) for each thread by the CPU average usage rate (from the non-competitive CPU % data) for the time that the lock was held generates the "real usage time" that the lock is used by each thread.

For example, thread T2 is granted lock L4 at time t3 and releases lock L4 at time t6. Accordingly, the real usage time of lock L4 by thread T2 is the difference of t6-t3 multiplied by the CPU average usage rate for the duration of time from time t3 to time t6. As discussed in further detail below, this real usage time, which is determined using the additional data, may allow the runtime to better manage lock access for the threads based on the effective CPU time instead of the real-world time.

As mentioned above, the additional data used by the runtime in the management of lock access also includes a threshold value for each thread's job. More specifically, each job has a time limit in which it must be completed, otherwise the job fails. Each competitive thread is assigned a threshold value, which is related to the time limit in which the thread's entire job must be completed in order for the job to be considered safe. In at least one embodiment of the present disclosure, each threshold value is between 0 and 1. As described in more detail below, these threshold values are utilized by the runtime in determining lock access management.

Using information from both the gathered preliminary data and gathered additional data, the runtime performs a number of evaluations. Then, using the results of these evaluations, the runtime determines how to manage the threads' access to the locks in such a manner that deadlocks are avoided. One example of a method in which the runtime performs such evaluations and determines how to manage the threads' access to locks in such a manner is shown in FIG. 7.

Figure 7:
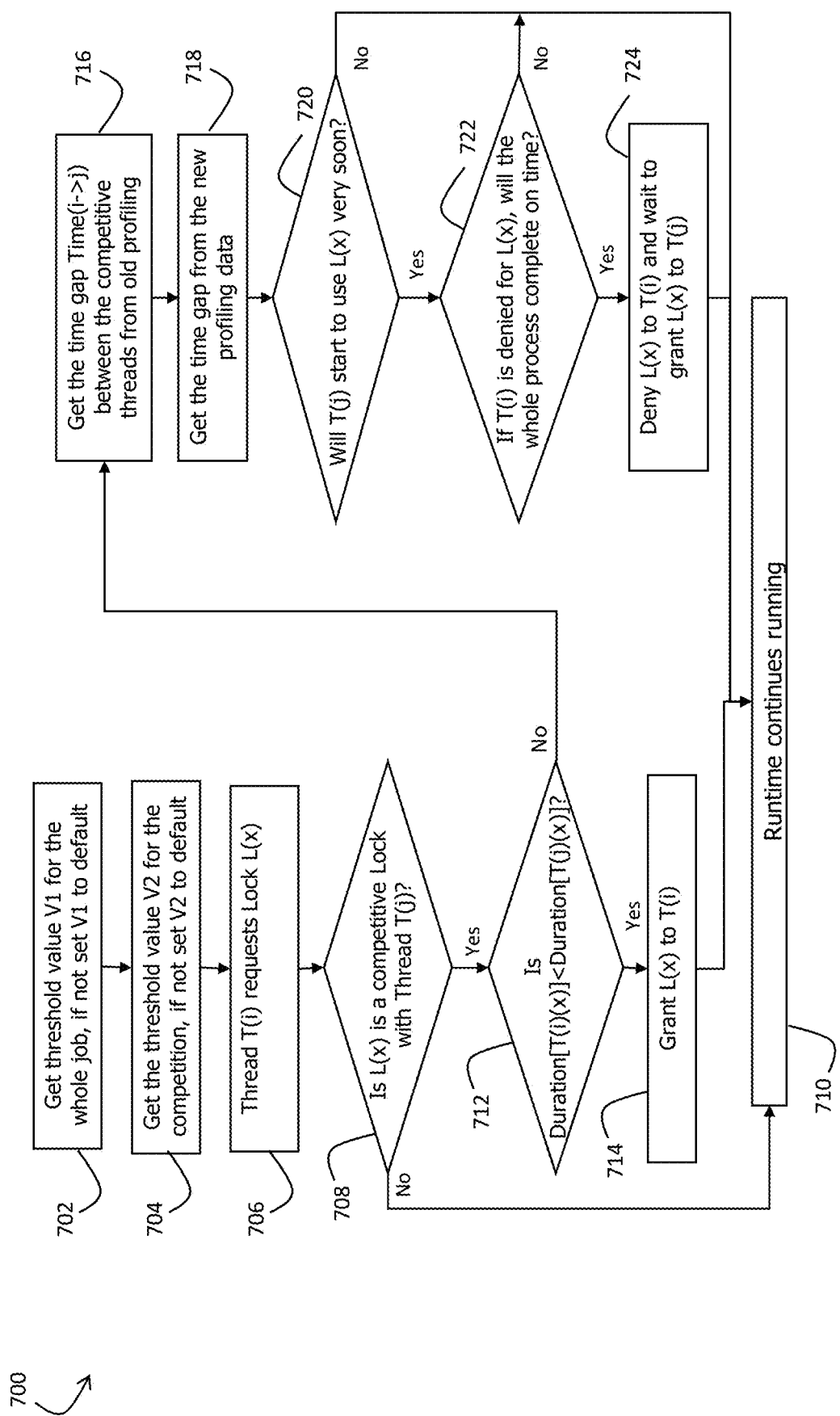
FIG. 7 illustrates a flowchart of an example method for preventing a deadlock between the two competitive threads, in accordance with embodiments of the present disclosure.

In particular, as shown in the method 700 of FIG. 7, at operation 702, the runtime obtains threshold value V1 from the additional data. In some embodiments of the present disclosure, the additional data may not include a threshold value V1. In such embodiments, the runtime sets the threshold value V1 to a default value, for example 0.8. As described in further detail below, the threshold value V1 is used in an evaluation to determine how to manage the threads' access to locks.

Similarly, at operation 704, the runtime obtains threshold value V2 from the additional data. In some embodiments of the present disclosure, the additional data may not include a threshold value V2. In such embodiments, the runtime sets the threshold value V2 to a default value, for example 0.5. As described in further detail below, the threshold value V2 is used in an evaluation to determine how to manage the threads' access to locks.

At operation 706, a first thread requests a first lock. In the embodiment shown in FIGS. 3-6, the first thread is thread T1, because it begins first. In the embodiment shown in FIGS. 3-6, the first lock is lock L1, because this is the first lock that thread T1 requests. Accordingly, by way of this example embodiment shown in FIGS. 3-6, thread T1 is the thread T(i) and lock L1 is the lock L(x) for the purposes of this discussion of operation 706 and method 700.

At operation 708, the runtime checks the preliminary data to see if the requested lock L(x) is or will be competitively sought by a competing second thread, Thread T(j). If the runtime determines that the requested lock L(x) is not or will not be competitively sought by a competing second thread ("No"), then, as shown at operation 710, the runtime continues running. In at least one embodiment of the present disclosure, this includes granting the requested lock L(x) to thread T(i). However, if the runtime determines that the requested lock L(x) is or will be competitively sought by a competing second thread T(j) ("Yes"), then the runtime proceeds instead to operation 712.

In the example embodiment of FIGS. 3-6, thread T2 is the thread T(j). Accordingly, at operation 708, when the runtime checks the preliminary data, the runtime determines that the requested lock L1 is or will be competitively sought by thread T2. Therefore, instead of proceeding to operation 710, the runtime proceeds to operation 712.

At operation 712, the runtime performs the first of a number of evaluations to determine whether to grant or deny the requested lock L(x) to the first thread T(i). In the example embodiments shown in FIG. 7, three evaluations are performed to determine whether to grant or deny the requested lock L(x) to the first thread T(i). In alternative embodiments, it is possible that more or fewer than three evaluations are performed. The first evaluation compares the durations of which each of the threads will have the requested lock to determine whether the duration for which the first thread T(i) will have the requested lock L(x) is less than the duration for which the second thread T(j) will have the requested lock L(x). In the embodiment shown in FIG. 7, this comparison is indicated by the expression "Duration [T(i)(x)]<Duration[T(j)(x)]?"

The duration for which each thread will have the requested lock is determined using the "real usage time," discussed above. By using the "real usage time," calculated using the additional data (which was gathered during a non-competitive scenario), the runtime is able to make a more accurate and effective comparison of the computing resources that each thread will need while it has the requested lock.

Figure 8:
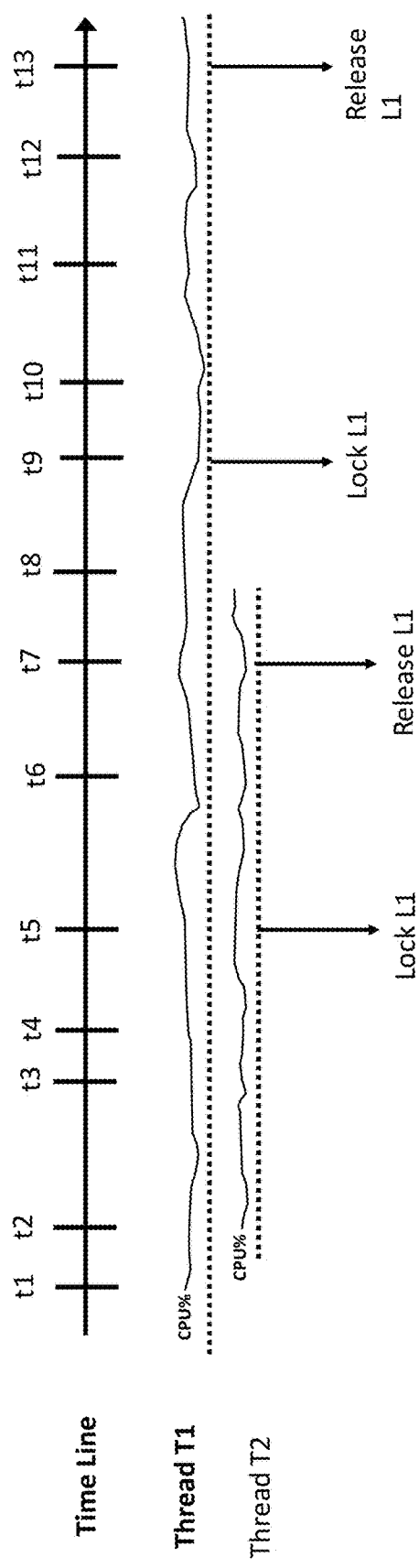
FIG. 8 depicts a schematic view of the data for the two competitive threads that pertains to one particular lock, in accordance with embodiments of the present disclosure.

With reference to the example embodiment of FIGS. 3-6, this comparison of the real usage times of lock L1 by thread T1 and by thread T2 is illustrated in FIG. 8. For this comparison, only the information for each thread that pertains to lock L1 is important. Accordingly, that information has been isolated from FIG. 6 into FIG. 8. The duration for which the thread T1 will have the requested lock (which could be expressed as Duration[T(1)L(1)]) is the difference between time t13 (when T1 releases L1) and t9 (when T1 is granted L1) multiplied by the CPU average usage rate during that time. Similarly, the duration for which the thread T2 will have the requested lock (which could be expressed as Duration[T(2)L(1)]) is the difference between time t7 (when T2 releases L1) and t5 (when T2 is granted L1) multiplied by the CPU average usage rate during that time.

As shown in FIG. 7, if the duration for which the first thread T(i) will have the requested lock L(x) is less than the duration for which the second thread T(j) will have the requested lock L(x), then the result of the evaluation is "Yes" (or "True"). Accordingly, the method 700 then proceeds to operation 714 wherein the runtime grants the requested lock L(x) to the first thread T(i). In other words, even though the first and second threads are competitive for the lock, because the first thread to request the lock will have it for a smaller duration, the runtime will go ahead and grant the first thread's request for the first lock.

Otherwise, if the duration for which the first thread T(i) will have the requested lock L(x) is not less than the duration for which the second thread T(j) will have the requested lock L(x), then the result of the evaluation is "No" (or "False"). In other words, in this case, the duration for which the second thread T(j) will have the requested lock L(x) is less than the duration for which the first thread T(i) will have the requested lock L(x). Accordingly, the method then proceeds to operation 716, wherein the runtime prepares to perform a second evaluation to determine whether to grant or deny the requested lock L(x) to the first thread T(i).

More specifically, at operation 716 the runtime obtains an old time gap between competing threads from the competitive scenario data. The old time gap refers to the gap in time between when the first thread T(i) starts and when the second thread T(j) starts. Accordingly, by obtaining the old time gap, the runtime obtains the competitive start times for each of the threads T(i) and T(j). These times can be expressed as "Start(Ti)" and "Start(Tj)," respectively. In the example shown in FIGS. 3-6, the old time gap is the gap in time between t1 (when T1 joins) and t2 (when T2 joins).

At operation 718, the runtime obtains a new time gap between competing threads from the non-competitive scenario data. The new time gap refers to the difference between when the first thread T(i) starts to use the requested lock L(x) and when the second thread T(j) starts to use the requested lock L(x). Accordingly, by obtaining the new time gap, the runtime obtains the non-competitive start lock acquisition times for the requested lock L(x) for each of the threads T(i) and T(j). These times can be expressed as "Start(L(Ti)(x))" and "Start(L(Tj)(x))," respectively. In the example shown in FIGS. 3-6, the new time gap is the gap in time between t9* (when L1 is granted to T1) and t5 (when L1 is granted to T2).

At operation 720, the runtime performs the second of the three evaluations to determine whether to grant or deny the requested lock L(x) to the first thread T(i). In particular, the runtime uses the old time gap, the new time gap, the duration for which the first thread T(i) will have the requested lock L(x), and the second threshold value V2 to determine whether the second thread T(j) will start to use the requested lock L(x) very soon relative to the time that the requested lock L(x) will be held by the first thread T(i). This determination can be represented by the expression:

$$V2 > [(Start(Tj) + (Start(L(Tj)(x)) - Start(Tj)) * P) - (Start(Ti) + (Start(L(Ti)(x)) - Start(Ti)) * P)] / Duration(L(i)(x)).$$

Figure 9:
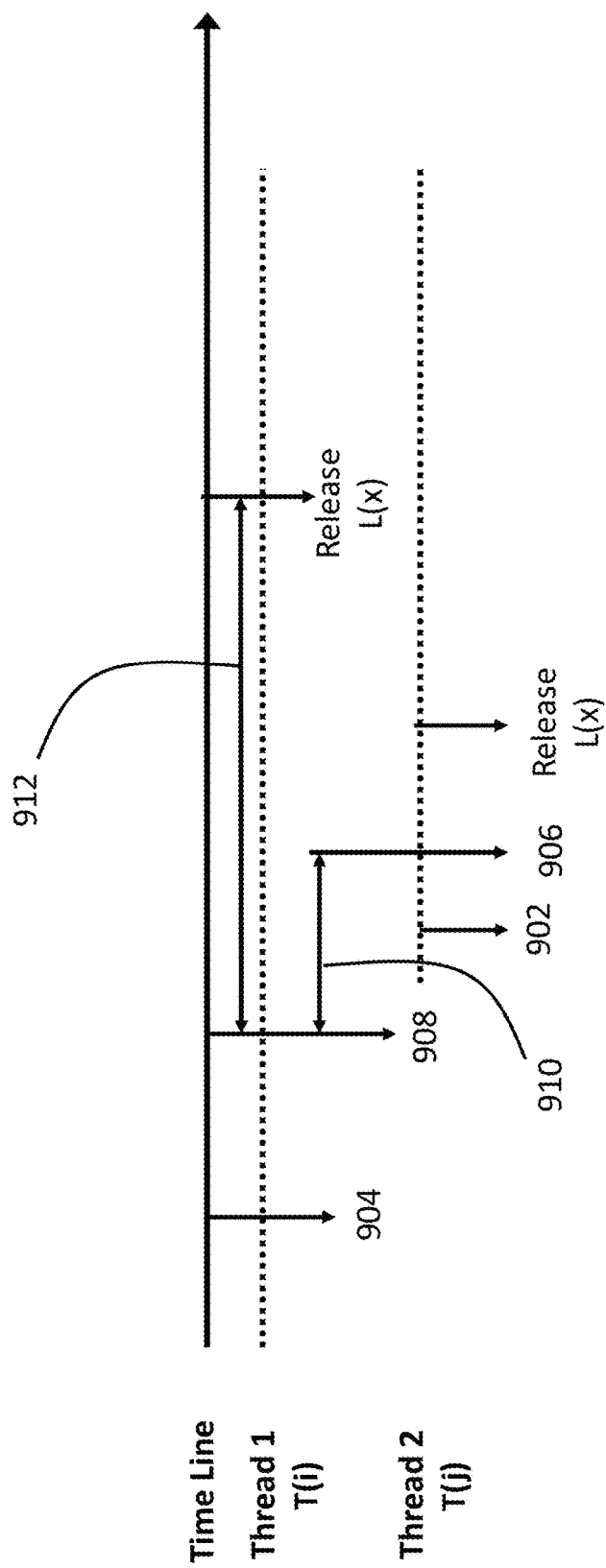
FIG. 9 depicts an example application of some of the data collected for two competitive threads in the method of FIG. 7, in accordance with embodiments of the present disclosure.

An illustrative example of the evaluation of phrases of this expression, according to some embodiments of the present disclosure, is shown in FIG. 9.

In this expression, Start(Tj) represents the start time for the second thread from the competitive scenario data and Start(Ti) represents the start time for the first thread from the competitive scenario data. Accordingly, these values are obtained from the old time gap. These values are shown in FIG. 9 and indicated by reference numerals 902 and 904, respectively.

Start(L(Tj)(x))−Start(Tj) of the above expression represents the time difference between the time that the second thread gets the requested lock and the start time for the second thread. This phrase is inside a set of parentheses that is followed by *P, which indicates that these times are obtained from the non-competitive scenario data. Similarly, Start(L(Ti)(x))−Start(Ti) represents the time difference between the time that the first thread gets the requested lock and the start time for the first thread. This phrase is also inside a set of parentheses that is followed by *P. Accordingly, these times are also obtained from the non-competitive scenario data.

Accordingly, the phrase (Start(Tj)+(Start(L(Tj)(x))-Start(Tj))*P) indicates that the start time for the second thread from the competitive scenario is added to the difference between the time that the second thread gets the requested lock and the start time for the second thread from the non-competitive scenario data to generate a new compiled start time for the second thread which represents how soon the second thread will start to use the requested lock. The new compiled start time for the second thread is indicated in FIG. 9 by the reference numeral 906.

Similarly, the phrase (Start(Ti)+(Start(L(Ti)(x))−Start(Ti))*P) indicates that the start time for the first thread from the competitive scenario is added to the difference between the time that the first thread gets the requested lock and the start time for the first thread from the non-competitive scenario data to generate a new compiled start time for the first thread which represents how soon the first thread will start to use the requested lock. The new compiled start time for the first thread is indicated in FIG. 9 by the reference numeral 908.

Thus, the phrase [(Start(Tj)+(Start(L(Tj)(x))-Start(Tj))*P)−(Start(Ti)+(Start(L(Ti)(x))−Start(Ti))*P)] represents the difference between how soon the second thread will start to use the requested lock and how soon the first thread will start to use the requested lock. This difference is indicated in FIG. 9 by the reference numeral 910.

The phrase [(Start(Tj)+(Start(L(Tj)(x))-Start(Tj))*P)-(Start(Ti)+(Start(L(Ti)(x))-Start(Ti))*P)]/Duration(L(i)(x)) indicates that this difference is then divided by the duration of time for which the first thread will have the requested lock. This duration has already been calculated for operation 712 of the method 700, so this value can simply be re-used in operation 720. The duration is indicated in FIG. 9 by the reference numeral 912.

The expression [(Start(Tj)+(Start(L(Tj)(x))-Start(Tj))*P)-(Start(Ti)+(Start(L(Ti)(x))-Start(Ti))*P)]/Duration(L(i)(x))<V2? is evaluated by comparing this quotient to threshold value V2. If the runtime determines that the quotient is not less than V2, then the result of the evaluation is "No" (or "False"). This indicates that the second thread T(j) will not start using the requested lock L(x) very soon relative to the time that the requested lock L(x) will be held by the first thread T(i). In this case, the method 700 proceeds to operation 710, wherein the runtime continues running. In at least one embodiment of the present disclosure, this includes granting the requested lock L(x) to thread T(i).

If the runtime instead determines that the quotient is less than V2, then the result of the evaluation is "Yes" (or "True"). This indicates that the second thread T(j) will start using the requested lock L(x) very soon relative to the time that the requested lock L(x) will be held by the first thread T(i). In this case, the method 700 proceeds to operation 722, wherein the runtime makes the third evaluation.

At operation 722, the runtime performs the third of the three evaluations to determine whether to grant or deny the requested lock L(x) to the first thread T(i). In particular, the runtime determines whether, if the requested lock L(x) is denied to the first thread T(i), and is instead granted to the second thread T(j), it is still possible for the whole process to complete on time. In order for the whole process to complete on time, both the second thread T(j) and the first thread T(i) must complete their respective jobs on time (not fail). This determination can be represented by the expression:

$$\text{Current\_time}+[\text{Whole\_time}-\text{start}[T(i)L(x)]] < \text{time\_limit}*V1.$$

Accordingly, to perform the third evaluation, the runtime compares a threshold time limit, which is represented in the expression by the phrase "time limit*V1," with the time that both the first thread T(i) and the second thread T(j) will complete their jobs if the requested lock L(x) is denied to the first thread T(i) and is granted to the second thread T(j), which is represented in the expression by the phrase "Current_time+[Whole_time-start[T(i)L(x)]]."

To determine the threshold time limit (time limit*V1), the threshold value V1 is multiplied by a time_limit by which both the first thread T(i) and the second thread must complete their jobs. In other words, the threshold time limit (time_limit*V1) incorporates a buffer or safeguard amount of time. In this example, the threshold value V1 can be 0.8. Accordingly, the threshold time limit (time limit*V1) is 80% of the time limit. In other words, the threshold time limit (time limit*V1) includes a 20% buffer.

To determine the time that both the first thread T(i) and the second thread T(j) will complete their jobs if the requested lock L(x) is denied to the first thread T(i) and is granted to the second thread T(j), the time when the runtime grants the requested lock L(x) to the first thread T(i) is subtracted from the time of completion of the jobs of the both the first thread T(i) and the second thread T(j). The time when the runtime grants the requested lock L(x) to the first thread T(i) and the time of the completion of both jobs are obtained from the non-competitive scenario. This is represented in the expression by the phrase "[Whole_time-start[T(i)L(x)]]." The result of this subtraction provides the minimum amount of time that is necessary for the first thread T(i) to complete its job if the requested lock L(x) is denied to the first thread T(i) and is granted to the second thread T(j) and the first thread T(i) has to wait until the second thread T(j) requests, uses, and releases the requested lock L(x).

The element "Current_time" represents the time at which the runtime makes the third evaluation. Accordingly, to perform the third evaluation, the runtime adds the minimum amount of time that is necessary to the Current_time as indicated by the phrase "Current_time+[Whole_time-start[T(i)L(x)]]." By comparing the result of this phrase to the threshold time limit (time_limit*V1), the runtime determines whether both the first thread T(i) and the second thread T(j) will be able to complete their jobs on time if the runtime denies the first thread T(i) the requested lock L(x) and grants it to the second thread T(j).

If the result of the evaluation of the expression Current_time+[Whole_time-start[T(i)L(x)]]<time_limit*V1 is "No" (or "False"), this indicates that the process will not complete on time if the requested lock L(x) is denied to the first thread T(i) and is granted to the second thread T(j). In this case, method 700 proceeds with operation 710, and the runtime continues running. In at least one embodiment of the present disclosure, this includes granting the requested lock L(x) to thread T(i).

If the result of the evaluation of the expression Current_time+[Whole_time-start[T(i)L(x)]]<time_limit*V1 is "Yes" (or "True"), this indicates that the process will complete on time if the requested lock L(x) is denied to the first thread T(i) and is granted to the second thread T(j). In this case, by performing the three evaluations, the runtime has determined that: 1) the duration for which the second thread T(j) will have the requested lock L(x) is less than the duration for which the first thread T(i) will have the requested lock L(x); 2) the second thread T(j) will start to use the requested lock L(x) very soon relative to the amount of time that the requested lock L(x) will be held by the first thread T(i); and 3) that the process will complete on time if the requested lock L(x) is denied to the first thread T(i) and is granted to the second thread T(j). Accordingly, method 700 proceeds with operation 724, and the runtime denies the requested lock L(x) to the first thread T(i) and grants the requested lock L(x) to the second thread T(j) when the second thread T(j) requests the requested lock L(x). Thus, the first thread T(i) waits for the requested lock L(x) until the second thread T(j) has requested, used, and released the requested lock L(x). In other words, in response to denying the request for the requested lock L(x) from the first thread T(i), the first thread T(i) is kept waiting while the second thread T(j) requests, uses, and releases the requested lock L(x).

The method 700 then proceeds to operation 710, wherein the runtime continues running. In at least one embodiment of the present disclosure, this includes granting the requested lock L(x) to thread T(i). In at least one embodiment of the present disclosure, the request for the requested lock L(x) is granted to the first thread T(i) in response to the second thread T(j) releasing the requested lock L(x). In at least one embodiment of the present disclosure, the first thread T(i) periodically re-requests the requested lock L(x), and the request is granted once the second thread T(j) has released the requested lock L(x).

By performing these three evaluations, the runtime determines whether it is safe to prevent an expected deadlock by denying a requested lock to a first thread and having the first thread wait while a second thread uses the requested lock. Accordingly, by performing the method 700, the runtime prevents the expected deadlock without requiring source code to be rewritten or the program to be recompiled.

Figure 10:
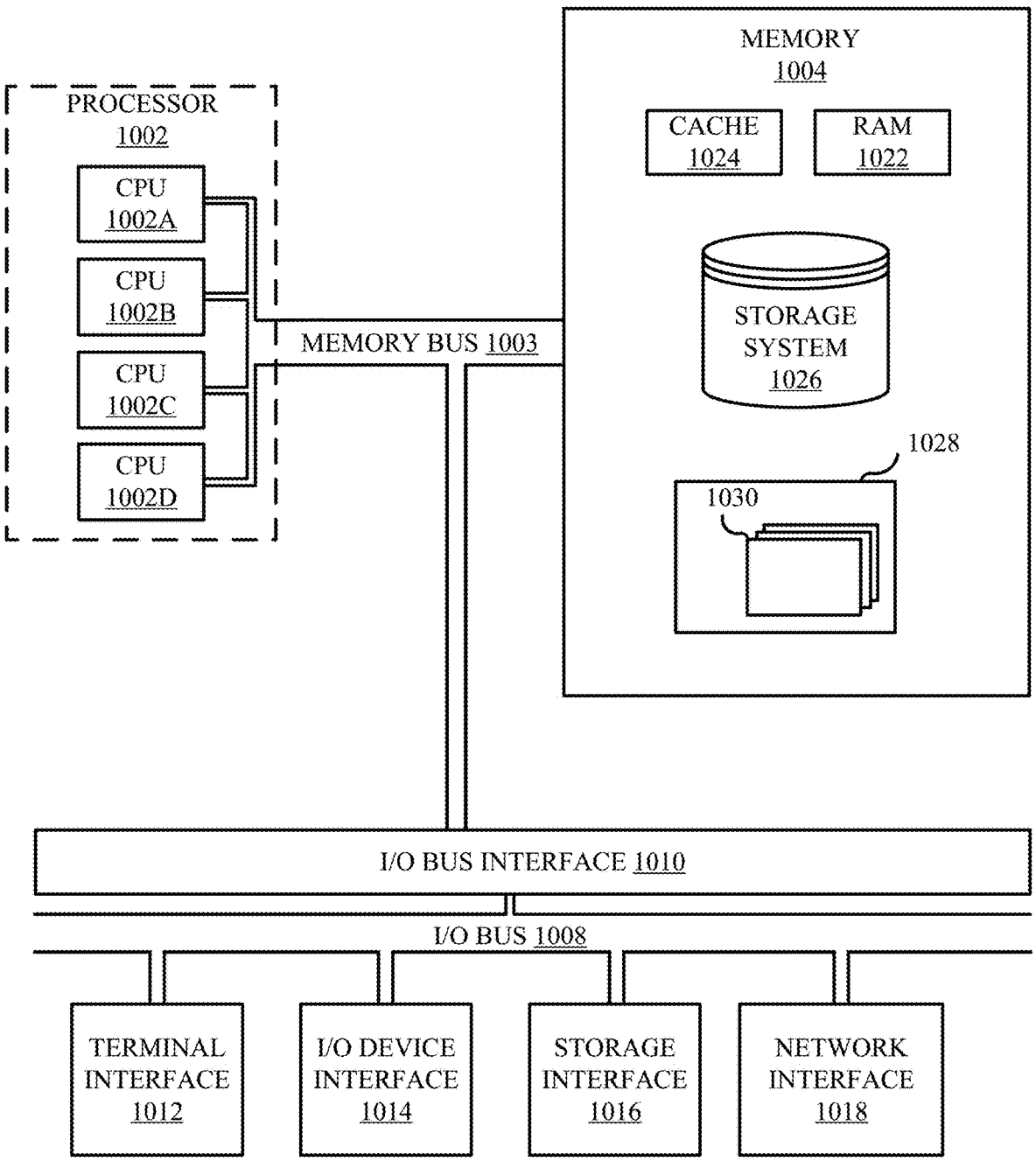
FIG. 10 illustrates a high-level block diagram of an example computer system that may be used in implementing one or more of the methods, tools, and modules, and any related functions, described herein, in accordance with embodiments of the present disclosure.

Referring now to FIG. 10, shown is a high-level block diagram of an example computer system 1001 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1001 may comprise one or more CPUs 1002, a memory subsystem 1004, a terminal interface 1012, a storage interface 1016, an I/O (Input/Output) device interface 1014, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable central processing units (CPUs) 1002A, 1002B, 1002C, and 1002D, herein generically referred to as the CPU 1002. In some embodiments, the computer system 1001 may contain multiple processors typical of a relatively large system; however, in other embodiments the computer system 1001 may alternatively be a single CPU system. Each CPU 1002 may execute instructions stored in the memory subsystem 1004 and may include one or more levels of on-board cache. In some embodiments of the present disclosure, the CPU 1002 can execute the processes disclosed herein (e.g., the processes of method 700).

System memory 1004 may include computer system readable media in the form of volatile memory, such as random access memory (RAM) 1022 or cache memory 1024. Computer system 1001 may further include other removable/non-removable, volatile/non-volatile computer system storage media. By way of example only, storage system 1026 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1004 can include flash memory, e.g., a flash memory stick drive or a flash drive. Memory devices can be connected to memory bus 1003 by one or more data media interfaces. The memory 1004 may include at least one program product having a set (e.g., at least one) of program modules that are configured to carry out the functions of various embodiments.

One or more programs/utilities 1028, each having at least one set of program modules 1030 may be stored in memory 1004. The programs/utilities 1028 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units are shown, which separate the I/O bus 1008 from various communications paths running to the various I/O devices, in other embodiments some or all of the I/O devices may be connected directly to one or more system I/O buses.

In some embodiments, the computer system 1001 may be a multi-user mainframe computer system, a single-user system, or a server computer or similar device that has little or no direct user interface, but receives requests from other computer systems (clients). Further, in some embodiments, the computer system 1001 may be implemented as a desktop computer, portable computer, laptop or notebook computer, tablet computer, pocket computer, telephone, smart phone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method, comprising:
   receiving a request for a lock from a first thread;
   in response to receiving the request, identifying a potential deadlock between the first thread and a second thread, the potential deadlock associated with access to the requested lock;
   in response to identifying the potential deadlock:
      determining whether a first duration for which the first thread will hold the requested lock to complete its respective job is longer than a second duration for which the second thread will hold the requested lock to complete its respective job;
      determining whether a time at which the second thread will start to use the requested lock is less than a predetermined threshold when accounting for a time at which the first thread will start to use the requested lock; and
      determining whether both the first and second threads will complete their respective jobs within a time limit if the requested lock is denied to the first thread while the second thread completes its job; and
   when all of the determinations are true, denying the request for the requested lock from the first thread.

2. The method of claim 1, further comprising:
   in response to denying the request for the requested lock from the first thread, keeping the first thread waiting while the second thread requests, uses, and releases the requested lock.

3. The method of claim 2, further comprising:
   in response to the second thread releasing the requested lock, granting the request for the requested lock from the first thread.

4. The method of claim 1, wherein:
   determining if the first duration for which the first thread will hold the requested lock to complete its respective job is longer than the second duration for which the second thread will hold the requested lock to complete its respective job includes performing an evaluation using non-competitive data pertaining to the requested lock from each of the first thread and the second thread.

5. The method of claim 4, wherein:
   the non-competitive data is collected while each of the first and second threads are run in a non-competitive scenario.

6. The method of claim 4, wherein:
   determining whether the time at which the second thread will start to use the requested lock is less than the predetermined threshold when accounting for the time at which the first thread will start to use the requested lock includes performing an evaluation using:
      the non-competitive data pertaining to the requested lock from each of the first thread and the second thread, and
      competitive data pertaining to the requested lock from each of the first thread and the second thread.

7. The method of claim 6, wherein the competitive data is collected while each of the first and second threads is run in a competitive scenario.

8. The method of claim 6, wherein:
   determining if both the first and second threads will complete their respective jobs within a time limit if the requested lock is denied to the first thread while the second thread completes its job includes performing an evaluation using:
   the non-competitive data pertaining to the requested lock from each of the first thread and the second thread,
   the competitive data pertaining to the requested lock from each of the first thread and the second thread, and
   a second threshold value.

9. A computer program product comprising a computer-readable storage medium having program instructions embodied therewith, the program instructions executable by a processor to cause the processor to perform a method comprising:
   receiving a request for a lock from a first thread;
   in response to receiving the request, identifying a potential deadlock between the first thread and a second thread, the potential deadlock associated with access to the requested lock;
   in response to identifying the potential deadlock:
   determining whether a first duration for which the first thread will hold the requested lock to complete its respective job is longer than a second duration for which the second thread will hold the requested lock to complete its respective job;
   determining if whether a time at which the second thread will start to use the requested lock is less than a predetermined threshold when accounting for a time at which the first thread will start to use the requested lock; and
   determining whether both the first and second threads will complete their respective jobs within a time limit if the requested lock is denied to the first thread while the second thread completes its job; and
   when all of the determinations are true, denying the request for the requested lock from the first thread.

10. The computer program product of claim 9, wherein the method further comprises:
    in response to denying the request for the requested lock from the first thread, keeping the first thread waiting while the second thread requests, uses, and releases the requested lock.

11. The computer program product of claim 10, wherein the method further comprises:
    in response to the second thread releasing the requested lock, granting the request for the requested lock from the first thread.

12. The computer program product of claim 9, wherein:
    determining if a first duration for which the first thread will hold the requested lock to complete its respective job is longer than a second duration for which the second thread will hold the requested lock to complete its respective job includes performing an evaluation using non-competitive data pertaining to the requested lock from each of the first thread and the second thread.

13. The computer program product of claim 12, wherein:
    the non-competitive data is collected while each of the first and second threads are run in a non-competitive scenario.

14. The computer program product of claim 12, wherein:
    determining whether the time at which the second thread will start to use the requested lock is less than the predetermined threshold when accounting for the time at which the first thread will start to use the requested lock includes performing an evaluation using:
    the non-competitive data pertaining to the requested lock from each of the first thread and the second thread, and
    competitive data pertaining to the requested lock from each of the first thread and the second thread.

15. The computer program product of claim 14, wherein:
    the competitive data is collected while each of the first and second threads is run in a competitive scenario.

16. The computer program product of claim 14, wherein:
    determining if both the first and second threads will complete their respective jobs within a time limit if the requested lock is denied to the first thread while the second thread completes its job includes performing an evaluation using:
    the non-competitive data pertaining to the requested lock from each of the first thread and the second thread,
    the competitive data pertaining to the requested lock from each of the first thread and the second thread, and
    a second threshold value.

17. A computer system, comprising:
    a memory; and
    a processor communicatively coupled to the memory, wherein the processor is configured to perform a method, comprising:
    receiving a request for a lock from a first thread;
    in response to receiving the request, identifying a potential deadlock between the first thread and a second thread, the potential deadlock associated with access to the requested lock;
    in response to identifying the potential deadlock:
    determining whether a first duration for which the first thread will hold the requested lock to complete its respective job is longer than a second duration for which the second thread will hold the requested lock to complete its respective job;
    determining whether a time at which the second thread will start to use the requested lock is less than a predetermined threshold when accounting for a time at which the first thread will start to use the requested lock; and
    determining whether both the first and second threads will complete their respective jobs within a time limit if the requested lock is denied to the first thread while the second thread completes its job; and
    when all of the determinations are true, denying the request for the requested lock from the first thread.

18. The computer system of claim 17, wherein the method further comprises:
    in response to denying the request for the requested lock from the first thread, keeping the first thread waiting while the second thread requests, uses, and releases the requested lock.

19. The computer system of claim 18, wherein the method further comprises:
    in response to the second thread releasing the requested lock, granting the request for the requested lock from the first thread.

20. The computer system of claim 17, wherein:
determining if a first duration for which the first thread will hold the requested lock to complete its respective job is longer than a second duration for which the second thread will hold the requested lock to complete its respective job includes performing an evaluation using non-competitive data pertaining to the requested lock from each of the first thread and the second thread.

* * * * *